(12) United States Patent
Yamamoto et al.

(10) Patent No.: US 7,164,531 B2
(45) Date of Patent: Jan. 16, 2007

(54) IMAGE STABILIZATION APPARATUS

(75) Inventors: Mitsuo Yamamoto, Yokohama (JP); Youichi Yokoi, Kasukabe (JP); Shunichi Haga, Kodaira (JP)

(73) Assignees: Nikon Vision Co., Ltd., Tokyo (JP); Nikon Corporation, Tokyo (JP)

( * ) Notice: Subject to any disclaimer, the term of this patent is extended or adjusted under 35 U.S.C. 154(b) by 0 days.

(21) Appl. No.: 11/227,766

(22) Filed: Sep. 16, 2005

(65) Prior Publication Data
US 2006/0007545 A1 Jan. 12, 2006

Related U.S. Application Data

(63) Continuation of application No. 10/458,302, filed on Jun. 11, 2003, now abandoned.

(30) Foreign Application Priority Data

Jun. 13, 2002 (JP) .............................. 2002-173031

(51) Int. Cl.
*G02B 27/64* (2006.01)
*G03B 17/00* (2006.01)

(52) U.S. Cl. .......................... 359/554; 359/557; 396/55

(58) Field of Classification Search ................ 359/554, 359/555, 557, 407, 480–482; 396/52–55
See application file for complete search history.

(56) References Cited

U.S. PATENT DOCUMENTS

| | | | |
|---|---|---|---|
| 5,576,788 A | 11/1996 | Miyazawa et al. ............ 396/52 |
| 6,009,278 A | 12/1999 | Okano et al. ................. 396/55 |
| 6,097,895 A | 8/2000 | Furuyama .................... 396/55 |
| 6,384,976 B1 | 5/2002 | Ishijima et al. ............. 359/557 |
| 6,515,799 B1 | 2/2003 | Ishijima et al. ............. 359/557 |
| 2002/0047906 A1 | 4/2002 | Ohta .......................... 348/208 |

FOREIGN PATENT DOCUMENTS

EP 0 834 761 4/1998

*Primary Examiner*—Mark A. Robinson
*Assistant Examiner*—Mark Consilvio
(74) *Attorney, Agent, or Firm*—Miles & Stockbridge P.C.

(57) ABSTRACT

An image stabilization apparatus comprises a housing accommodating an optical system in the interior thereof. A part of optical members that compose the optical system is held to allow angular displacement relative to the housing, and the position of the part of the optical members is maintained in a predetermined state. The part of the optical members is driven to restore the position angularly displaced. A driving amount is controlled based on information of the angular displacement. A mode for controlling the housing that is suitable for vibration applied to the housing is determined, and the mode is informed to a user.

6 Claims, 10 Drawing Sheets

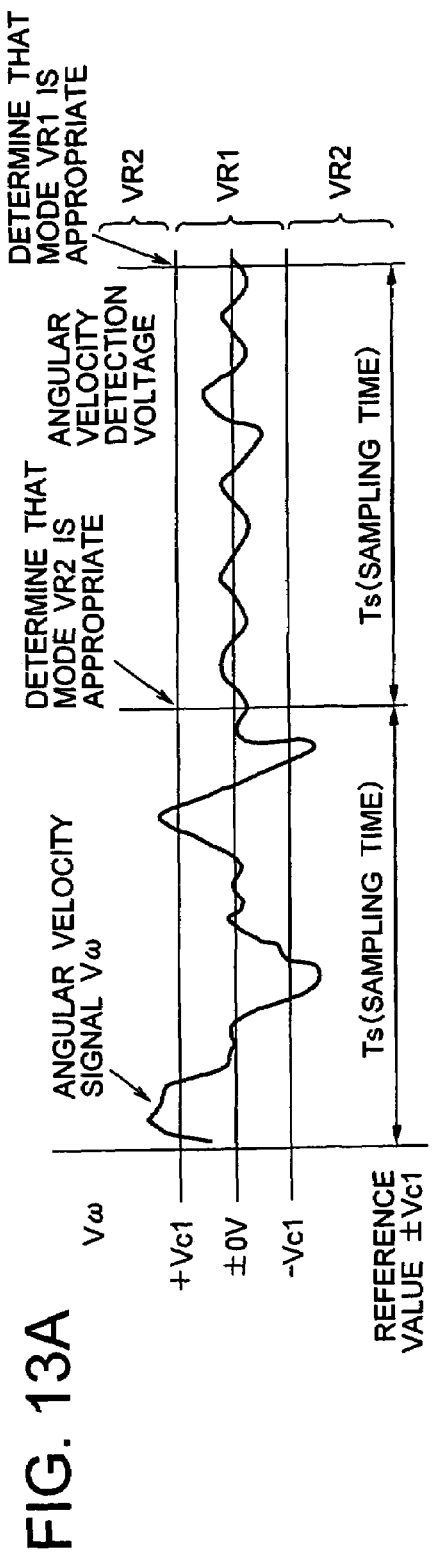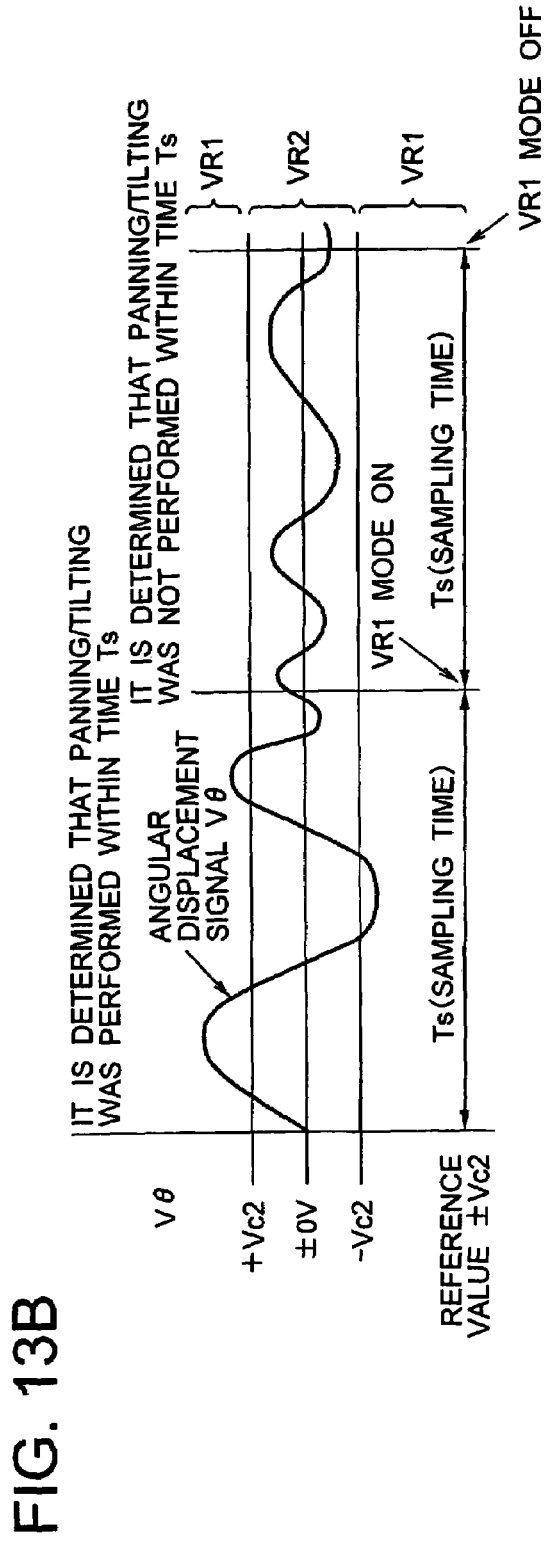

IMAGE STABILIZATION APPARATUS

CROSS-REFERENCE TO RELATED APPLICATIONS

This application is a continuation of application Ser. No. 10/458,302 filed Jun. 11, 2003 now abandoned, and also claims the benefit of Japanese Patent application No. 2002-173031 which is hereby incorporated by reference.

BACKGROUND OF THE INVENTION

1. Field of the Invention

The present invention relates to an image stabilization apparatus to be equipped in various optical apparatus such as a binocular or monocular.

2. Related Background Art

Reference is made here, by way of example, to Japanese Patent Application Laid-Open No. 10-104681, which discloses an image stabilization apparatus. A prior art image stabilization apparatus disclosed in this Japanese Patent Application Laid-Open No. 10-104681 is provided with an erecting prism, a gimbaled member to which the erecting prism is attached, position feedback control means and angular velocity feedback control means for controlling the position or posture of the gimbaled member. The angular velocity feedback control means is a feedback loop that detects an angular velocity of the gimbaled member that is created due to hand shake or other causes and enhances following-up ability of the gimbaled member to the optical axis of the objective lens based on a detection result. A position feedback loop is a feedback loop that detects an angular displacement of the gimbaled member that is created due to hand shake or other causes and enhances following-up ability of the gimbaled member to the optical axis of the objective lens based on a detection result. With the above-described structure, Japanese Patent Application Laid-open No. 10-104681 teaches a technology to change a gain of the position feedback control means in response to a user's switching operation of a mode switch to realize a mode for reducing vibration created by hand shake and a mode for providing a high following-up performance to panning and tilting operations.

Another patent document Japanese Patent Application Laid-Open No. 2001-100106 discloses an image stabilization apparatus in which a vibration reduction mode and a panning/tilting mode are switched automatically.

Specifically, in this prior art, the apparatus detects the angular velocity and an angular positional displacement of a gimbaled member and determines whether or not the detected values are larger (or alternatively, smaller) than predetermined values. Then, the apparatus determines an appropriate mode to automatically set this appropriate mode.

In addition, in the technology disclosed in Japanese Patent Application Laid-Open No. 2001-100106, a user can freely switch the mode at his or her will by a manual operation. Even during observation under a mode that has been set manually, the apparatus detects the angular velocity and the angular positional displacement of the gimbaled member, determines the appropriate mode, and when it is determined that the appropriate mode is different from the manually selected mode, the mode is automatically switched to the appropriate mode determined by the apparatus.

In the above-described technology disclosed in Japanese Patent Application Laid-Open No. 10-104681, the mode is manually selected on user's own discretion, and therefore it would be difficult for an unskilled user to determine the optimum mode definitely. Therefore, in some cases, a mode other than that selected by the user may be the optimum mode. In such cases, the performance of the apparatus would not be brought out fully.

On the other hand, in the technology disclosed in Japanese Patent Application Laid-Open No. 2001-100106, the switching of the vibration reduction mode is effected automatically in accordance with the degree of the vibration of the apparatus. However, if the mode is thus switched automatically, the mode determined by the apparatus as the appropriate mode sometimes differs from the mode that the user has selected in accordance with his or her intention. In that case, the user sometimes feels it undesirable to observe under the mode automatically switched based on the determination by the apparatus.

SUMMARY OF THE INVENTION

An object of the present invention is to provide an image stabilization apparatus that has a good usability.

In order to attain the above object, according to one aspect of the present invention, there is provided an image stabilization apparatus comprising:

a housing accommodating an optical system in the interior thereof;

holding means for holding a part of optical members that compose the optical system in such a way as to allow angular displacement of said part of the optical members relative to the housing, in order to maintain the position of said part of the optical members in a predetermined state;

driving means for angularly displacing said part of the optical members in the direction for restoring the position of said part of the optical members that has been angularly displaced;

control means for controlling the driving means, the control means including detection means for detecting information on angular displacement of said part of the optical members and determination means for determining, based on the information detected by the detection means, a control mode for controlling the driving means and suitable for vibration applied to the housing; and an informing section that informs a user of information relating to the control mode determined by the determination means.

In the image stabilization apparatus according to the present invention, the angular displacement information may comprise information on angular velocity of the holding means and/or information on angular displacement amount of the holding means.

In the image stabilization apparatus according to the present invention, the determination by the determination means may be made based on a comparison of a predetermined reference value and the angular displacement information.

In the image stabilization apparatus according to the present invention, the reference value may comprise a reference value for the angular velocity and/or a reference value for the angular displacement amount.

In the image stabilization apparatus according to the present invention, the determination by the determination means may be made based on a comparison of the reference value and the angular displacement information obtained within a predetermined sampling time, and based on the number of times the angular displacement information becomes larger than and/or smaller than the reference value.

In the image stabilization apparatus according to the present invention, the control mode determined by the determination means may be a mode selected from at least two vibration reduction modes.

In the image stabilization apparatus according to the present invention, the apparatus may be so adapted that the user can select between an automatic switching mode in which the control mode is automatically switched to the mode determined by the determination means based on the angular displacement information detected by the detection means and a user setting mode in which the user is allowed to select the control mode.

In addition, in this image stabilization apparatus, when the selected mode is the user setting mode, the informing section may be adapted to provide information on whether the mode selected under the user setting mode and the mode determined by the determination means are different or identical.

In the image stabilization apparatus according to the present invention, the informing section may be adapted to identify the control mode determined by the determination means.

In the image stabilization apparatus according to the present invention, the apparatus may be so adapted that the user can select and set any mode based on the information of which the user is informed by the informing section.

The image stabilization apparatus according to the present invention may further comprise first calculation means for performing calculation on a detection result of the detection means based on a first predetermined calculation method to determine a driving amount, second calculation means for performing calculation on a detection result of the detection means based on a second predetermined calculation method to determine a driving amount, and decision means for determining calculation means, from among the first and second calculation means, that is suitable for vibration applied to the housing.

In this image stabilization apparatus, the decision means may make the determination by comparing the detection result of the detection means with a predetermined reference value.

This image stabilization apparatus may further comprise an automatic mode switching means for causing the driving means to operate by the driving amount determined by the calculation means that is determined from among the first and second calculation means by the decision means.

In this image stabilization apparatus, when an angular displacement amount based on the information on angular displacement deviates from a predetermined range a predetermined number of times or more within a predetermined sampling time, the decision means may be adapted to determine that panning or tilting of the housing is occurring and select calculation means that is suitable for the panning or tilting from among the first and second calculation means.

In this image stabilization apparatus, when the angular velocity deviates from a predetermined range a predetermined number of times or more within a predetermined sampling time, the decision means may be adapted to determine that the user is on a conveyance so as to select calculation means that is suitable for vibration caused by the conveyance from among the first and second calculation means.

The image stabilizing apparatus according to the present invention may further comprise an observation optical system, and the informing section may include a display provided within a field of view of the observation optical system.

In the image stabilization apparatus according to the present invention, the informing section may include a sound generator with which the informing section provides information using a sound.

According to another aspect of the present invention, there is provided a binocular comprising:

a pair of eyepiece optical systems;

a pair of objective optical systems;

an intermediate optical system provided on an optical axis between the eyepiece optical systems and objective optical systems;

a housing accommodating the eyepiece optical systems, the objective optical systems and the intermediate optical system;

holding means for holding a part of optical members that compose the intermediate optical system in such a way as to allow angular displacement of said part of the optical members relative to the housing, in order to maintain the position of said part of the optical members in a predetermined state;

driving means for angularly displacing said part of the optical members in the direction for restoring the position of said part of the optical members that has been angularly displaced;

control means for controlling the driving means, the control means including detection means for detecting information on angular displacement of said part of the optical members and determination means for determining, based on the information detected by the detection means, a control mode for controlling the driving means and suitable for vibration applied to the housing; and an informing section that informs a user of information relating to the control mode determined by the determination means.

BRIEF DESCRIPTION OF THE DRAWINGS

FIGS. 13A and 13B are diagrams for illustrating comparison of reference values and signals in a process for determining vibration reduction mode performed by the CPU 601 of the image stabilization apparatus 100 according to the first embodiment of the present invention.

DETAILED DESCRIPTION OF THE PREFERRED EMBODIMENTS

In the following, embodiments of the present invention will be described. In the following embodiments, descriptions will be made with reference to an image stabilization apparatus equipped in a binocular. However, it should be understood that the present invention may also be applied to other optical apparatus. For example, the invention may be applied to a monocular apparatus such as a telescope etc.

First, a description will be made of a binocular equipped with an image stabilization apparatus as a first embodiment of the present invention.

Figure 1:
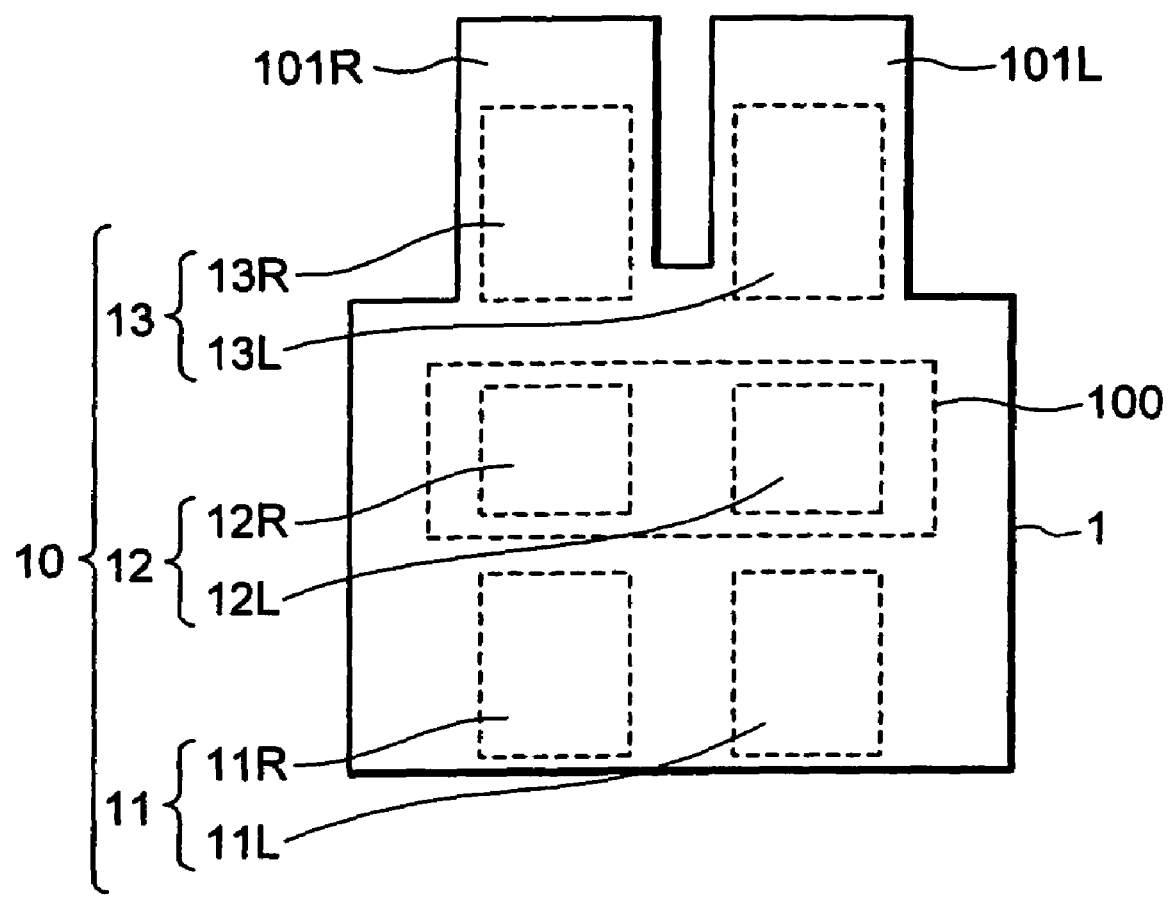
FIG. 1 is a drawing schematically showing the internal structure of a binocular as an embodiment of the present invention.
Figure 2A:
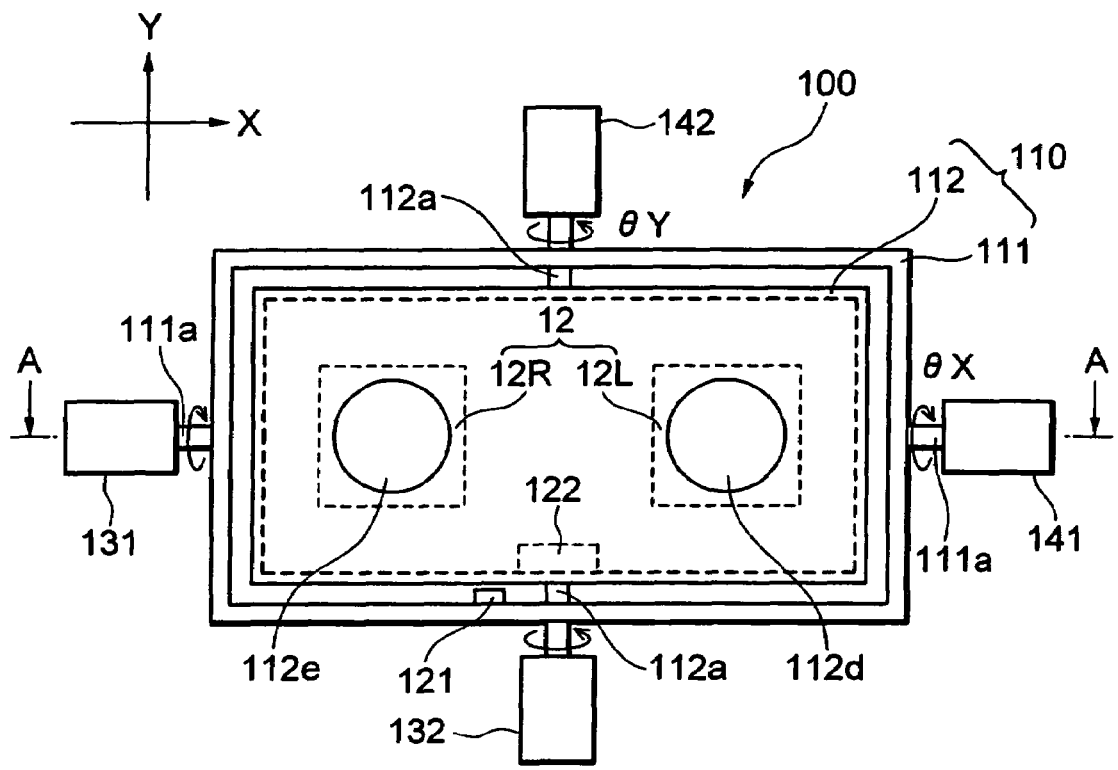
FIG. 2A is a front view showing the structure of an image stabilization apparatus 100 in the embodiment of the present invention.
Figure 2B:
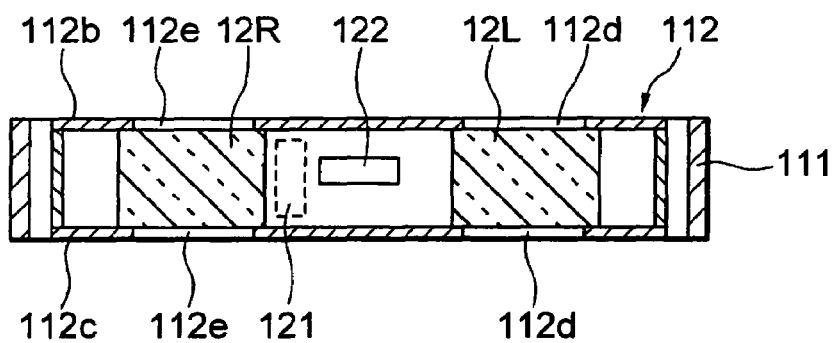
FIG. 2B is a cross sectional view taken on line A—A in FIG. 2A.

Referring to FIG. 1 and FIG. 2A, The binocular equipped with an image stabilization apparatus according to the embodiment has a binocular optical system 10, a housing 1 accommodating the binocular optical system, and an image stabilization apparatus 100. The image stabilization apparatus 100 is adapted to detect vibration generated during use of the binocular, such as vibration applied to the housing 1 due to hand shake, and to suppress such vibration.

Figure 3:
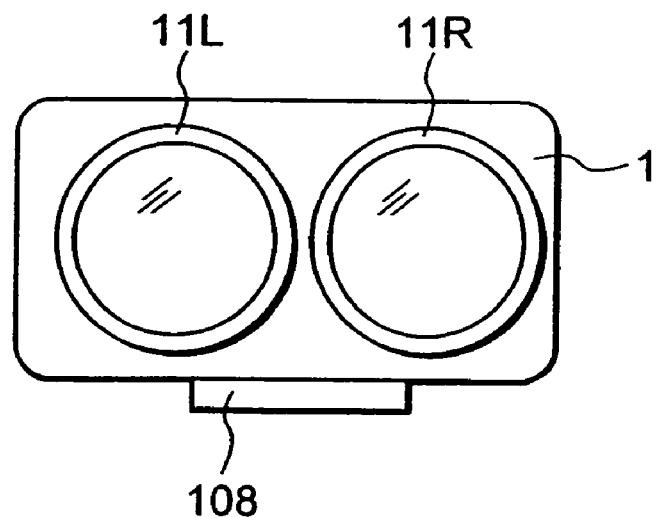
FIG. 3 is a rear view of the binocular according to the first embodiment of the present invention.
Figure 4:
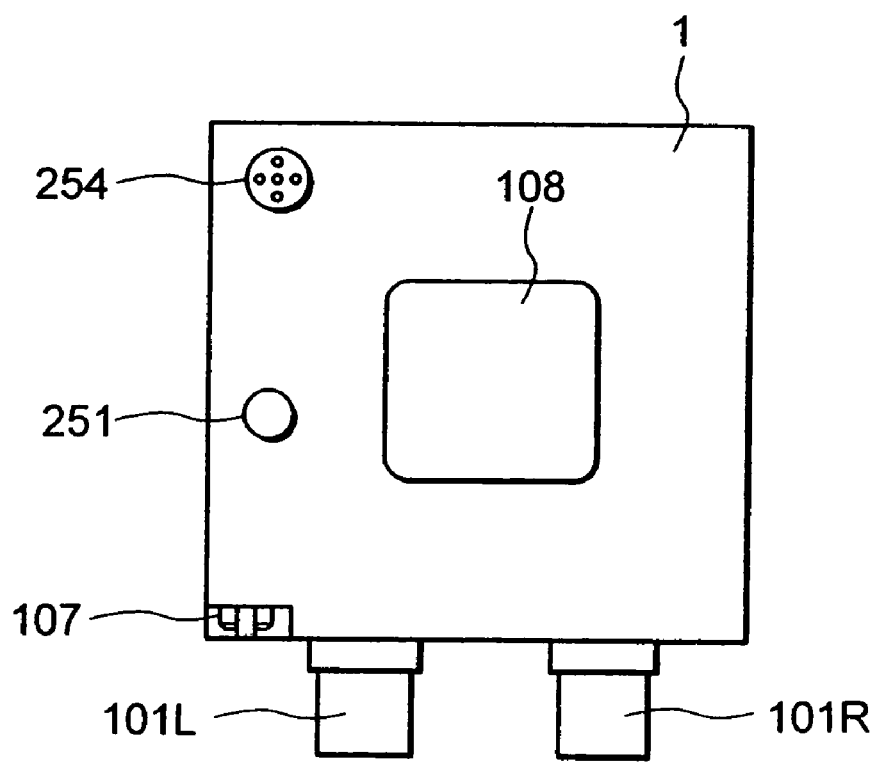
FIG. 4 is a top view of the binocular according to the first embodiment of the present invention.
Figure 5:
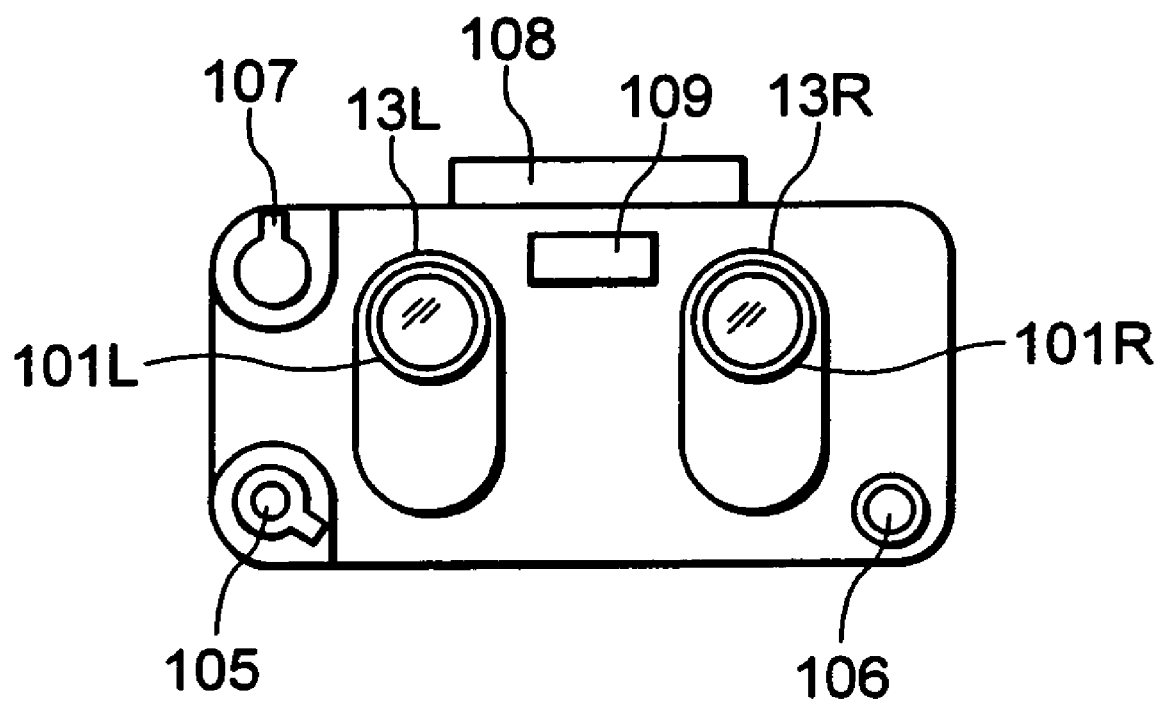
FIG. 5 is a front view of the binocular according to the first embodiment of the present invention.

As shown in FIG. 1, the binocular optical system 10 includes an objective optical system 11, an eyepiece optical system 13, an intermediate optical system 12 disposed between the objective optical system 11 and the eyepiece optical system 13. As illustrated in FIGS. 1 and 3, the objective optical system 11 includes objective lenses 11R and 11L. As shown in FIGS. 1, 4 and 5, the eyepiece optical system 13 includes eyepiece barrels 101R and 101L and eyepiece lenses 13R and 13L. The intermediate optical system 12 functions to direct a light flux from the objective optical system 11 to the eyepiece optical system 13. The intermediate optical system 12 is provided for performing, when vibration occurs in the binocular, optical compensation to prevent an object from disappearing out of the field of view. In this embodiment, the intermediate optical system 12 includes erecting prisms 12R and 12L.

The image stabilization apparatus 100 has a gimbal mechanism 110. The gimbal mechanism 110 includes an outer gimbaled member 111 having a rotation axis parallel to X-axis and an inner gimbaled member 112 having a rotation axis parallel to Y-axis. The inner gimbaled member 112 is supported by rotation shaft 112a in such a way as to be rotatable relative to the outer gimbaled member 111. The outer gimbaled member 111 is supported by rotation shaft 111a in such a way as to be rotatable relative to the housing 1. The inner gimbaled member 112 holds the erecting prisms 12R and 12L between two plate members 112b and 112c. The plate members 112b and 112c have openings 112d and 112e respectively at the positions of the left and right optical paths. With the above-described structure, when vibration or panning/tilting of the housing 1 occurs, the gimbaled members 111 and 112 are rotated relative to the housing respectively by inertial force so that the direction of the optical axes of the erecting prisms 12R and 12L would be kept unchanged with respect to the inertial system (i.e. with respect to the earth).

On the outer gimbaled member 111, there is mounted an angular velocity detector 121 for detecting the angular velocity ωx of the rotational movement about the rotation axis 111a parallel to X-axis. On the inner gimbaled member 112, there is mounted an angular velocity detector 122 for detecting the angular velocity ωy of the rotational movement about the rotation axis 112a parallel to Y-axis. Each of the angular velocity detectors 121 and 122 may be composed, for example, of a piezoelectric vibration gyro sensor.

In addition, an angular displacement detector 141 for detecting an angular displacement amount (i.e. a change in the angular position) θx caused by the rotation is attached to the rotation shaft 111a for rotation about the axis parallel to X-axis. Furthermore, an actuator 131 for rotationally driving the rotation shaft 111a that has been rotationally displaced in the rotational direction for returning the rotation axis 111a is also attached to the rotation shaft 111a. Similarly, to the rotation axis 112a for rotation about the axis parallel to Y-axis, there is attached an angular displacement detector 142 for detecting an angular displacement amount θy caused by the rotation and an actuator 132 for rotationally driving the rotation shaft 112a that has been rotationally displaced in the rotational direction for returning the rotation axis 112a. Thus, the angular displacement of the rotation of the outer and inner gimbaled members 111 and 112 about axes parallel to X-axis and Y-axis can be detected based on outputs of the angular displacement detectors 141 and 142. The directions of rotational drive by the actuators 131 and 132 are such directions with which the optical axis of the erecting prism 12R and 12L mounted on the gimbaled member 111 and 112 that have been rotated by inertial force would be restored to the original position (i.e. the optical axis of the objective optical system 11). Each of the actuators 131 and 132 may include, for example, a servo mechanism. Each of the angular displacement detectors 141 and 142 may include a rotary encoder.

Figure 6:
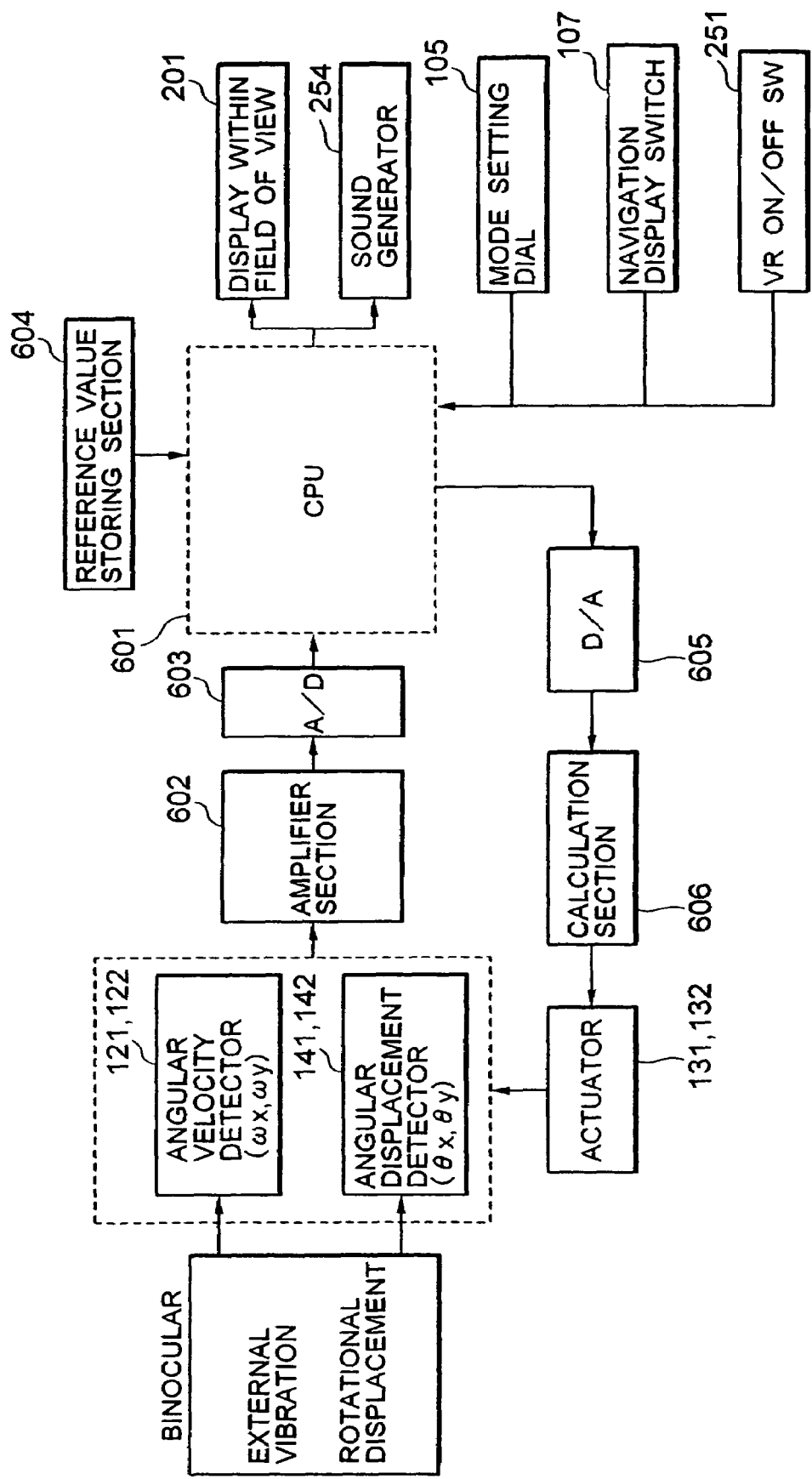
FIG. 6 is a block diagram showing the structure of the image stabilization apparatus 100 in the binocular according to the first embodiment of the present invention.
Figure 7:
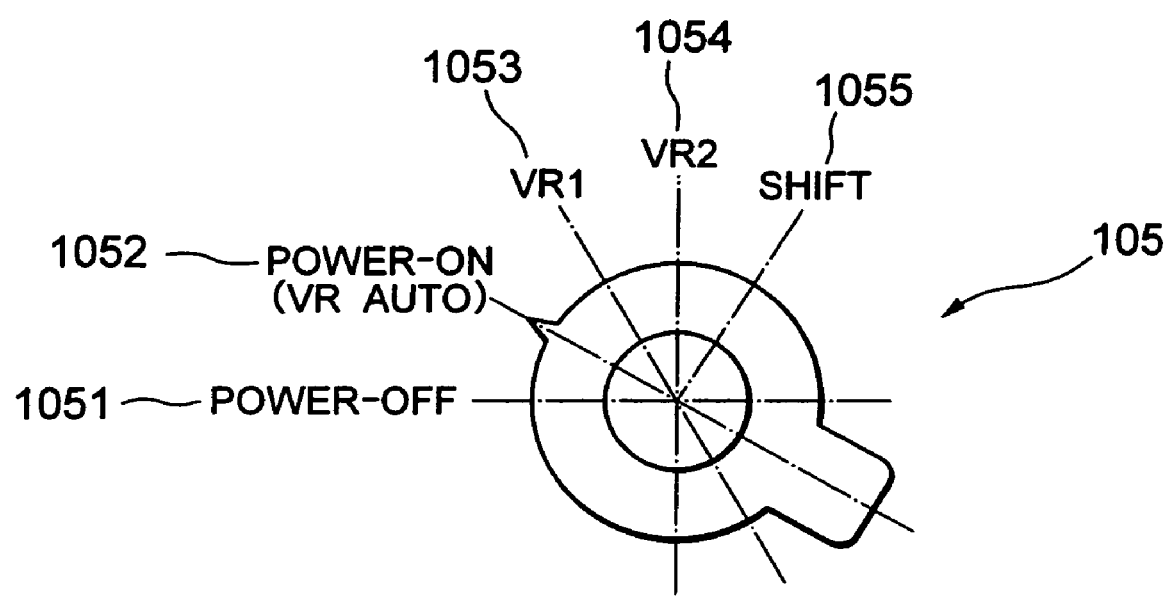
FIG. 7 is a top view showing the structure of a mode setting dial 105 of the image stabilization apparatus 100 in the binocular according to the first embodiment of the present invention.

As shown in FIG. 4, the image stabilization apparatus 100 is further provided with a button 251 for turning on/off the vibration reduction function disposed on the top surface of the housing 1, a sound generator 254 and a battery box 108. In addition, as shown in FIG. 5, the image stabilization apparatus 100 is provided with a switch 107 for switching a navigation display disposed on the front surface of the housing 1 and a mode setting dial 105. Furthermore, referring to FIG. 6, the image stabilization apparatus 100 has a CPU (central processing unit) 601, an amplifier section 602, an A/D converter 603, a reference value storing section 604, a D/A converter 605 and a calculator section 606. The control system as described above is accommodated in the interior of the housing 1. The image stabilization apparatus 100 is further provided with a display within the field of view 201 disposed within the field of view of either one of the eyepiece lenses 13R and 13L. In addition, a display 109 and a focus knob 106 are also provided on the front side surface of the housing 1.

The mode setting dial 105 is a dial type switch used for selecting the vibration reduction mode of the image stabilization apparatus 100. The apparatus according to this embodiment has two vibration reduction modes (mode VR1 and mode VR2) and an automatic mode for switching the mode VR1 and the mode VR2 automatically. While the apparatus according to this embodiment is described to have two modes VR1 and VR2 by way of example, the apparatus may be adapted to have more than two modes to be switched. The mode VR1 is a mode that is suitable for stabilizing the image at the occasion of performing observation on a steady ground or observation which involves frequent panning and tilting operations (e.g. at the time of bird watching). On the other hand, the mode VR2 is a mode suitable for stabilizing the image at the occasion of performing observation on a swinging or wavering board of a conveyance (e.g. a ship, a vehicle, an airplane or a helicopter etc.). The mode setting dial 105 has five positions to be switched, that is, "POWER-OFF" position 1051, "POWER-ON (VR AUTO: auto vibration reduction)" position 1052, "VR1" position 1053, "VR2" position 1054 and "SHIFT" position 1055. When the mode setting dial 105 is set to the "POWER-OFF" position 1051, power supply from the battery box 108 to each section of the image stabilization apparatus 100 is turned off and disabled, so that the gimbal mechanism 110 is placed into a locked state in which the gimbal mechanism 110 is maintained at the position of the center of the optical axis without angular displacement. Under this state, the binocular behaves as an ordinary binocular that is not provided with a vibration reduction function. When the mode setting dial 105 is set to the "POWER-ON (VR AUTO)" position 1052, the image stabilization apparatus 100 is turned on, and the vibration reduction mode is set to the automatic switching mode. When the mode setting dial 105 is set to the "VR1" position 1053 or the "VR2" position 1054, the vibration reduction mode is set to the vibration reduction mode VR1 or VR2 respectively. The operation under the dial setting to the "SHIFT" position 1055 will be described later.

Figure 10:
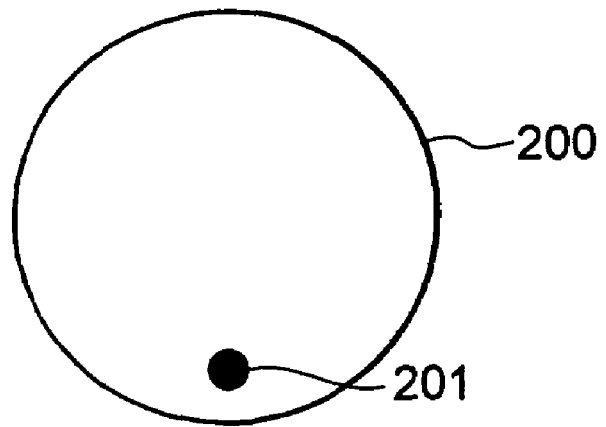
FIG. 10 is a drawing illustrating a display 201 within the field of view 200 of the binocular according to the first embodiment of the present invention.

In the following, functions characterizing the present invention will be specifically described. As shown in FIG. 10, the display within the field of view 201 is composed, for example, of an LED or other elements, and it is disposed in the field of view 200 of either one of the eyepiece lenses 13R and 13L. Under the state in which a vibration reduction mode is selected by setting of the mode setting dial 105 to the "VR1" position 1053 or the "VR2" position, if it is determined, based on the level or degree of the external vibration actually applied to the housing 1, that the selected mode is not the optimal mode, the display in the field of view 201 indicates with red light. This prompts the user to change the mode selected by the mode setting dial 105 to another mode. Such a prompting function for changing the mode is referred to in this embodiment as a vibration reduction mode navigation function.

Figure 9:
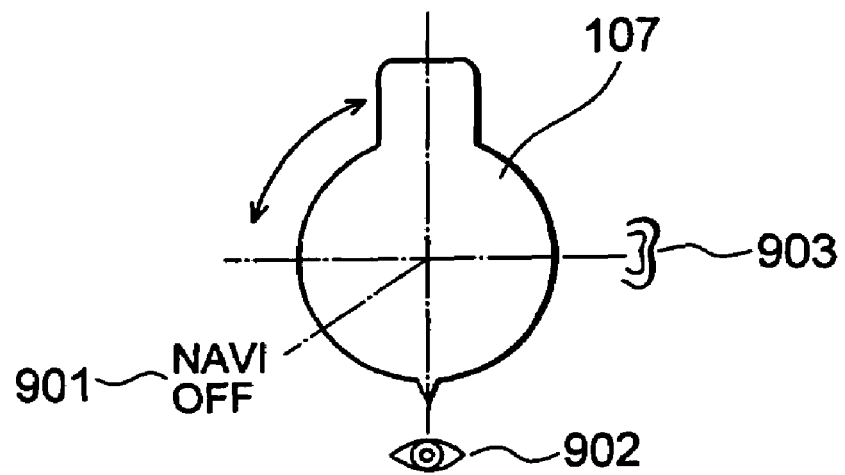
FIG. 9 is a top view showing the structure of a navigation display changing switch 107 of the image stabilization apparatus 100 in the binocular according to the first embodiment of the present invention.

Referring to FIG. 9, a navigation display changing switch 107 has multiple positions to be switched, namely, a "NAVI-OFF" position 901, an eye-mark position 902 and an ear-mark position 903. When the navigation display changing switch 107 is set to the eye-mark position 902, the prompt for changing the vibration reduction mode is performed by means of the display within the field of view 201. On the other hand, when the navigation display changing switch 107 is set to the ear-mark position 903, the indication by the display within the field of view 201 is not performed, but prompt for changing the vibration reduction mode is performed by beep sound or voice sound for prompting mode change generated by the sound generator 254. When the beep sound is used, its sound duration time or its frequency may be modulated in accordance with the vibration reduction mode. When the navigation display changing switch is set to the "NAVI OFF" position 901, the vibration reduction mode navigation function is disabled.

The vibration reduction on/off button 251 is enabled when the mode setting dial 105 is set to either one of the "POWER-ON (VR AUTO)" position 1052, the "VR1" position 1053, the "VR2" position 1054 or the "SHIFT" position 1055. When the mode setting dial 105 is set to either one of the "POWER-ON (VR AUTO)" position 1052, the "VR1" position 1053 or the "VR2" position 1054, the state in which the vibration reduction mode is disabled and the state in which the vibration reduction mode is enabled are alternately switched by manipulation of the vibration reduction on/off button. Under the state in which the vibration reduction mode is disabled, the gimbal mechanism 110 is placed in the locked state in which the gimbal mechanism is positioned at the original position without angular displacement. Under the state in which the vibration reduction mode is enabled, the vibration reduction mode corresponding to the setting of the mode setting dial 105 (i.e. either one of the auto switching mode, the VR1 mode or the VR2 mode) is enabled. Therefore, during observation under the vibration reduction mode (i.e. either one of the auto switching mode, the VR1 mode or the VR2 mode), the vibration reduction on/off button is useful for the user, when the user wants to disable the vibration reduction mode to lock the gimbal mechanism instantaneously for power saving or other reasons.

On the other hand, when the mode setting dial 105 is set to the "SHIFT" position 1055, the vibration reduction mode is alternately switched between VR1 and VR2 by manipulation of the vibration reduction on/off button 251. Therefore, during observation under the mode VR2, the mode setting dial 105 may be set to the "SHIFT" position in preparation for panning and tilting operation for following up an object such as a bird or an airplane that may possibly comes within the field of view, so that the vibration reduction mode can be changed to the mode VR2 by manipulating (or pressing) the vibration reduction of/off button 251. In connection with this, when the mode setting dial 105 is set to the "SHIFT" position 1055, the automatic vibration reduction mode change and the information by the display within the field of view 201 will not be enabled.

The above-described navigation function is so adapted to prompt the user to change the vibration reduction mode selected by the mode setting dial 105 into another mode. However, it may be modified to inform the user of the optimal mode determined by the external vibration level actually applied to the housing 1. If the function is so modified, the user can know the optimal mode determined by the apparatus, and therefore the user can be aware of the difference between the optimal mode and the mode selected by the user. In addition, if the mode selected by the user is also displayed together with the optimal mode determined by the apparatus, the user can recognize the difference in the modes easily.

Next, in the following, control operations by the CPU 601 of the image stabilization apparatus will be described.

Figure 8:
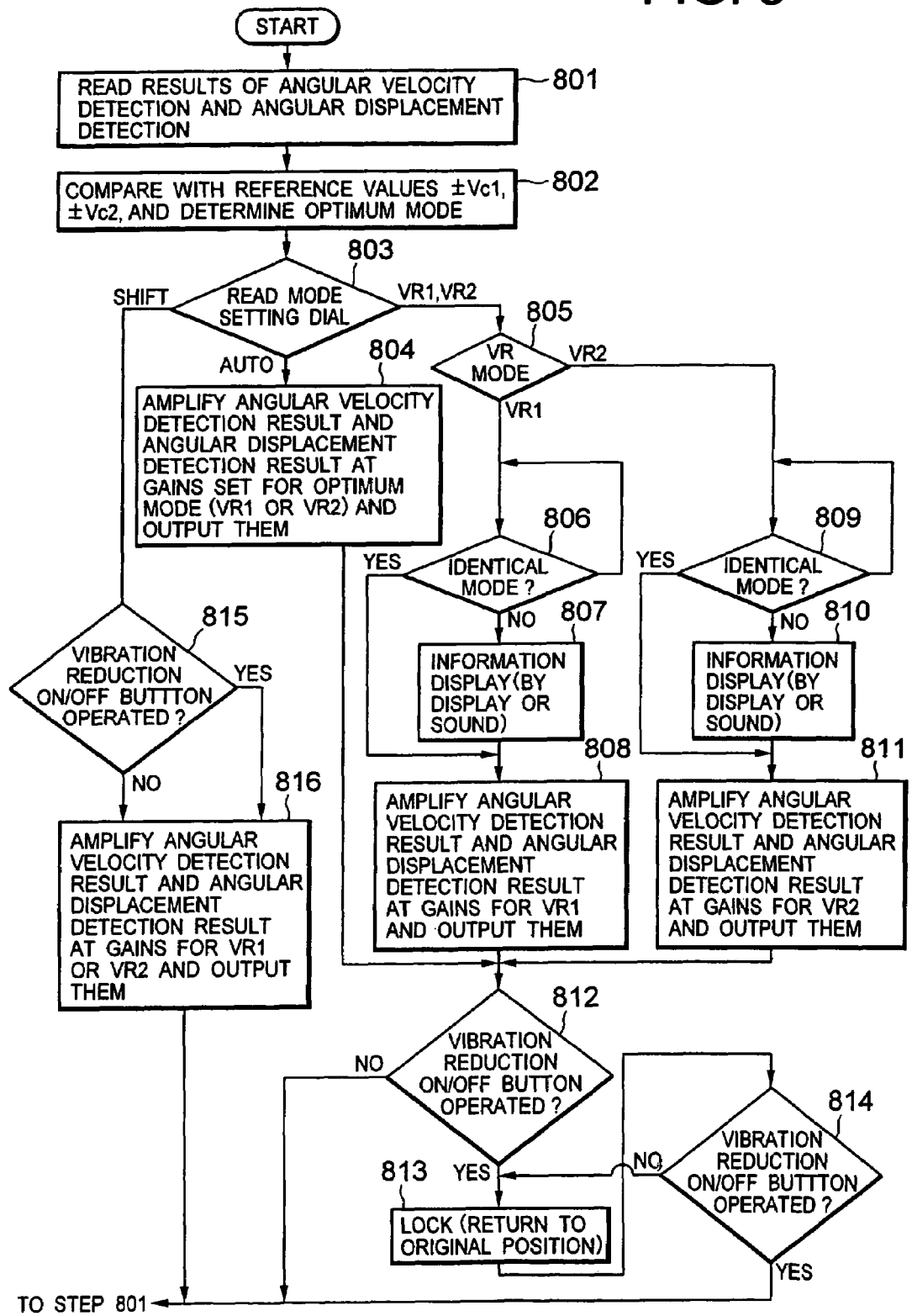
FIG. 8 is a flow chart showing a control process performed by a CPU 601 of the image stabilization apparatus 100 in the binocular according to the first embodiment of the present invention.

The CPU601 reads a program stored in the reference value storing section 604 upon turning-on of the power supply and executes the program to operate in the manner described in the flow chart presented in FIG. 8. First, in step 801, the CPU 601 receives, via the A/D converter 603, signals V$\omega$x and V$\omega$y that have been obtained by amplifying angular velocity $\omega$x and $\omega$y detected by the angular velocity detector 121 and 122 by a predetermined gain in the amplifier section 602. In addition, the CPU 601 also receives via the A/D converter 603, signals V$\theta$x and V$\theta$y that have been obtained by amplifying angular displacement amounts $\theta$x and $\theta$y detected by the angular displacement detectors 141 and 142 by a predetermined gain by the amplifier section 602.

Next in step 802, the CPU 601 compares the received angular velocity signals Vωx and Vωy with reference angular velocity values ±Vc1 stored in the reference value storing section 604 in advance respectively. In addition, the CPU 601 compares the received angular displacement amount signals Vθx and Vθy with reference angular displacement values ±Vc2 stored in the reference value storing section 604 in advance respectively. Based on the above-mentioned comparison, the CPU 601 determines whether the optimal mode is the mode VR1 or the mode VR2.

In the apparatus according to this embodiment, the angular velocity signals Vωx and Vωy are used as information for detecting vibration caused by conveyance. Specifically, as will be seen from FIG. 13A, if at least one of the angular velocity signals Vωx and Vωy becomes larger than +Vc1 or smaller than −Vc1, it is determined that the user is on a conveyance and so the mode VR2 is appropriate. In addition, in order not to mistakenly interpret angular velocity signals Vωx and Vωy corresponding to an user's unintentional action as those corresponding to vibration of a conveyance, a sampling time Ts is set in the apparatus according to this embodiment as shown in FIG. 13A. If the state in which at least one of the angular velocity signals Vωx and Vωy becomes larger than +Vc1 or smaller than −Vc1 occurs more than once during the sampling time Ts, it is determined that the optimal mode is the mode VR2.

On the other hand, the angular displacement amount signals Vθx and Vθy are used as information for detecting panning and tilting operations. Specifically, as will be seen from FIG. 13B, if at least one of the angular displacement amount signals Vθx and Vθy becomes larger than +Vc2 or smaller than −Vc2, it is determined that the user is performing a panning or tilting operation and so the mode VR1 is appropriate. As in the case of the angular velocity signals, in order to prevent erroneous interpretation of output corresponding to an user's unintentional action, if the state in which at least one of the angular displacement amount signals Vθx and Vθy becomes larger than +Vc1 or smaller than −Vc2 occurs more than once during the sampling time Ts, it is determined that the optimal mode is the mode VR1.

In the case in which the determination of the optimal mode conflicts between VR1 and VR2 (for example, when a user on a conveyance is performing panning or tilting operation), in other words, in the case in which at least one of Vωx and Vωy becomes larger than +Vc1 or smaller than −Vc1 more than once within the sampling time Ts and at least one of Vθx and Vθy becomes larger than +Vc2 or smaller than −Vc2 more than once within the sampling time Ts, it is determined in the apparatus according to this embodiment that the mode VR1 for panning/tilting is the optimal mode.

The above-described criteria in step 802 are summarized as follows:

(1) When during the sampling time Ts, both Vωx and Vωy are within the range larger than −Vc1 and smaller than +Vc1 (or deviate from this range only once) and at least one of Vθx and Vθy becomes smaller than −Vc2 or larger than +Vc2 more than once, it is determined that the optimal mode is the mode VR1;

(2) When during the sampling time Ts, both Vωx and Vωy are within the range larger than −Vc1 and smaller than +Vc1 (or deviate from this range only once) and both Vθx and Vθy are within the range larger than −Vc2 and smaller than +Vc2 (or deviate from this range only once), it is determined that the optimal mode is the mode VR2;

(3) When during the sampling time Ts, at least one of Vωx and Vωy becomes smaller than −Vc1 or larger than +Vc1 more than once and at least one of Vθx and Vθy becomes smaller than −Vc2 or larger than +Vc2 more than once, it is determined that the optimal mode is the mode VR1; and (4) When during the sampling time Ts, at least one of Vωx and Vωy becomes smaller than −Vc1 or larger than +Vc1 more than once and both Vθx and Vθy are within the range larger than −Vc2 and smaller than +Vc2 (or deviate from this range only once), it is determined that the optimal mode is the mode VR2

As per the above, in step 802, it is possible to determine the vibration reduction mode VR1 or VR2 that is optimal to the vibration level applied to the binocular, by comparing the angular velocity signals Vωx and Vωy and angular displacement amount signals Vθx and Vθy with the reference values ±Vc1 and ±Vc2 respectively.

Next in step 803, the CPU 601 reads to which position 1052 to 1055 the mode setting dial 105 is set. When the mode setting dial 105 is set to the "POWER-ON (VR AUTO)" position 1052, which means that automatic switching of the vibration reduction mode is selected, the process proceeds to step 804. In step 804, the CPU 601 controls to create outputs for causing the actuators 131 and 132 to rotationally drive the rotation shafts 111a and 111b of the gimbal mechanism 110 in accordance with the optimal vibration mode VR1 or VR2 determined in step 802.

Specifically, in step 804, if the vibration mode determined in step 802 is the mode VR1, the CPU 601 controls to amplify the angular velocity signals Vωx and Vωy at a predetermined gain α1 and to amplify the angular displacement amount signals Vθx and Vθy at a predetermined gain β1 and to output them. The output signals α1×Vωx, α1×Vωy, β1×Vθx and β1×Vθy are converted by the D/A converter 605 into analog signals and then input to the calculation section 606. The calculation section 606 performs predetermined calculation processing such as addition or integration on the output α1×Vωx and the output β1×Vθx and outputs the results to the actuator 131 for rotationally driving the rotation shaft 111a about X-axis. Thus, the actuator 131 rotationally drives the rotation shaft 111a with a driving voltage reflecting the outputs of the angular velocity signal Vωx and the angular displacement amount signal Vθx so as to rotate the outer gimbaled member 111 in the direction for bringing the optical axis of the erecting prism 12R and 12L closer to the original position (i.e. the optical axis of the objective optical system 11). In addition, the calculation section 606 also performs calculation processing such as addition or integration on the output α1×Vωy and the output β1×Vθy and outputs the results to the actuator 132 for rotationally driving the rotation shaft 112a about Y-axis. Thus, the actuator 132 rotationally drives the rotation shaft 112a with a driving voltage reflecting the outputs of the angular velocity signal Vωy and the angular displacement amount signal Vθy so as to rotate the inner gimbaled member 112 in the direction for bringing the optical axis of the erecting prism 12R and 12L closer to the original position (i.e. the optical axis of the objective optical system 11).

On the other hand, in the case in which the vibration reduction mode determined in step 802 is VR2, the CPU 601 also controls in step 804 to amplify the angular velocity signals Vωx and Vωy and the angular displacement amount signals Vθx and Vθy so as to output them, but the amplification is performed at gains α2 and β2 respectively. While gains α1 and β1 are predetermined values for realizing the vibration mode VR1 that is suitable for panning and tilting operations, gains α2 and β2 are predetermined values for realizing the vibration reduction mode VR2 that is suitable for the vibration of a conveyance. The gains α1 and β1 in the mode VR1 are set in such a way that the gimbal mechanism 110 is restrained to the original position more strongly than in the mode VR2. In other words, the gains α1 and β1 for the mode VR1 are so set that the field of view follows the movement of the housing upon panning and tilting operations. On the other hand, the gains α2 and β2 in the mode VR2 are set in such a way that the restraint of the gimbal mechanism 110 to the original position is weaker than in the mode VR1. In other words, the gains α2 and β2 in the mode VR2 are so set that the field of view is kept as constant (or steady) as possible relative to the inertial system (i.e. relative to the earth) even if the binocular vibrates due to vibration of a conveyance. Specifically, the ratio of the gain α1 for the angular velocity signal to the gain β1 for the angular displacement amount signal in the mode VR1 is made larger than the ratio of the gain α2 for the angular velocity signal to the gain β2 for the angular displacement amount signal in the mode VR2.

As per the above, the automatic switching of the vibration reduction mode between VR1 and VR2 is realized in step 804.

On the other hand, when it is turned out in step 803 that the mode setting dial 105 is set to the "VR1" position 1053 or the "VR2" position 1054, the process proceeds to step 805. In step 805, it is further determined whether the mode setting dial 105 is in the "VR1" position 1053 or in the "VR2" position 1054. When it is determined that the mode setting dial 105 is in the "VR1" position 1053, the process proceeds to step 806. In step 806, it is determined whether or not the optimal vibration reduction mode determined in step 802 is identical to the mode VR1 set by the mode setting dial 105. If they are not identical, the process proceeds to step 807, in which information for prompting mode change is presented to the user, since the currently set vibration reduction mode is not appropriate. The way of informing the user is pursuant to the setting by the navigation information changing switch 107. Specifically, when the eye-mark position 902 is selected, the LED in the display within the field of view 201 is turned on in red, while when the ear-mark position 903 is selected, a beep sound or a voice sound is generated from the sound generator 254, and then the process proceeds to step 808. In connection with this, when the navigation information changing switch 107 is set to the "NAVI OFF" position 901, the information is not presented and the process proceeds to step 808.

In the process shown in the flow chart of FIG. 8, it is determined in step 806 whether or not the optimal vibration reduction mode determined in step 802 is identical to the mode set by the user, which is determined in step 805. However, as described before, in the present invention the process may be modified in such a way as to inform the user of the optimal vibration reduction mode determined in step 802. In that case, step 806 for determining whether or not the optimal vibration reduction mode determined in step 802 is identical to the mode set by the user is not necessary (i.e. can be omitted). Therefore, the information made in step 807 will be information on the optimal vibration reduction mode determined in step 802.

In step 808, in order to realize the mode VR1, the CPU 601 controls to amplify the angular velocity signals Vωx and Vωy at a predetermined gain α1 and to amplify the angular displacement amount signals Vθx and vθy at a predetermined gain β1 and to output them in like manner as in step 804. Thus, the actuators 131 and 132 rotationally drive the rotation shafts 111a and 112a respectively with driving voltages reflecting the outputs of the angular velocity signals and the angular displacement amount signals so as to realize the vibration reduction mode VR1.

In step 808, the vibration reduction mode is switched to the optimal vibration reduction mode determined in step 802 automatically. However, in the present invention, whether or not the mode suggested by the information in step 807 is to be selected may be left to user's discretion. In that case, step 808 is not necessary (i.e. can be omitted). Therefore, if the user considers that observation under the mode selected by himself or herself is satisfactory, the user can continue the observation while maintaining the current mode without following the information. In addition, even if the user considers that observation under the current mode selected by himself or herself is satisfactory, the user can change the mode once when a mode different from the currently selected mode is suggested by the information and if the suggested mode provides better observation, the user would observe with the suggested mode. If the user finds, after changing the mode to the suggested mode, that observation under the mode selected by himself or herself is more preferable for him or her than observation under the suggested mode, the user would change the mode from the suggested mode to the mode previously selected by the user again.

As per the above, the present invention can provide an apparatus that reflects user's intention or taste to a greater degree.

After the above-described steps, the process proceeds to step 812, in which the CPU 601 detects whether or not the vibration reduction on/off button 251 has been manipulated within a predetermined time. When it is detected that the vibration reduction of/off button has been manipulated, the process proceeds to step 813, in which the CPU 601 outputs a signal for commanding the actuators 131 and 132 to return the rotation shafts 111a and 112a to the original positions and to maintain (or lock) them at that state. That signal is sent to the actuators 131 and 132 via the D/A converter 605, the calculation section 606, and the actuators 131 and 132 return the rotation shafts 111a and 112a to their original positions to maintain (or lock) them in that state. Thus, the gimbal mechanism 110 of the image stabilization apparatus 100 will not rotate from the original position, and therefore the binocular behaves as an ordinary binocular that does not have a vibration reduction function. The locking of the rotation shafts 111a and 112a is maintained until it is detected that the vibration reduction on/off button 251 is manipulated (or pressed) again. If it is determined in step 814 that the vibration reduction on/off button 251 is pressed again and the locking is released, or if it is determined in step 812 that the vibration reduction on/off button 251 has not been manipulated, the process returns to step 801.

Referring back to step 805, if it is determined in step 805 that the mode setting dial 105 is in the "VR2" position 1054, the process proceeds to step 809. In step 809, it is determined whether or not the optimal vibration reduction mode determined in step 802 is identical to the mode VR2 set by the mode setting dial 105. If they are not identical, the process proceeds to step 810, in which information for prompting mode change is presented to the user in like manner as in step 807, since the currently set vibration reduction mode is not appropriate.

As described before, the process may be modified in such a way as to inform the user of the optimal vibration reduction mode that is determined in step 802. In that case, step 809 for determining whether or not the optimal vibration reduction mode determined in step 802 is identical to the mode set by the user determined in step 805 is not necessary (i.e. can be omitted). Therefore, step 809 and step 810 are not necessary, and information of the optimal vibration reduction mode determined in step 802 is made only in step 807.

Then the process proceeds to step 811. In step 811, in order to realize the mode VR2, the CPU 601 controls to amplify the angular velocity signals Vωx and Vωy at a predetermined gain α2 and to amplify the angular displacement amount signals Vθx and Vθy at a predetermined gain β2 and to output them in like manner as in step 804. Thus, the actuators 131 and 132 rotationally drive the rotation shafts 111*a* and 112*a* respectively with driving voltages reflecting the outputs of the angular velocity signals and the angular displacement amount signals so as to realize the vibration reduction mode VR2. After that, the process proceeds to step 812.

As described before, whether or not the mode suggested by the information in step 810 is to be selected may be left to user's discretion. In that case, step 810 is not necessary (i.e. can be omitted).

Referring back to step 803, if the mode setting dial 105 is set to the "SHIFT" position 1055, the process proceeds to step 815. In step 815, it is determined whether the vibration reduction on/off button 251 has been manipulated (or pressed) within a predetermined time. In the state in which the mode setting dial 105 is set to the "SHIFT" position, the vibration reduction mode is switched between VR1 and VR2 automatically. Therefore, if it is determined in step 815 that the vibration reduction on/off button 251 has not been pressed, the process proceeds to step 816, and in order to realize the vibration reduction mode same as the previously set mode, which is assumed here to be the mode VR1 for example, if the mode set in the latest step 816 is VR1, the CPU 601 controls to amplify the angular velocity signals Vωx and Vωy at a predetermined gain α1 and to amplify the angular displacement amount signals Vθx and Vθy at a predetermined gain β1 and to output them. On the other hand, if it is determined in step 815 that the vibration reduction on/off button 251 has been pressed, the process proceeds to step 816, and in order to realize the vibration reduction mode different from the previously set mode (i.e. in order to realize the mode VR2, if the mode set in the latest step 816 is VR1,), the CPU 601 controls to amplify the angular velocity signals Vωx and Vωy at a predetermined gain α2 and to amplify the angular displacement amount signals Vθx and Vθy at a predetermined gain β2 and to output them. Thus, the actuators 131 and 132 rotationally drive the rotation shafts 111*a* and 112*a* so as to realize vibration reduction mode VR1 or VR2.

As per the above, in the binocular having the image stabilization apparatus 100 according to this embodiment, it is possible to realize a mode with which vibration reduction mode is automatically switched in accordance with the level or degree of vibration of the binocular. Under this automatic mode, it is possible, by setting a sampling time Ts, to distinguish movement of the binocular caused unintentionally by the user from intentional panning/tilting operations or vibration caused by conveyance. In addition, even if there is a time lag between detection of the angular velocity of the gimbal mechanism and detection of the angular displacement amount of the gimbal mechanism, it is possible to determine the optimal vibration reduction mode.

In addition, when a vibration reduction mode is set by a user at his or her will, the apparatus can inform the user whether that mode is the optimal vibration reduction mode or not, based on the above-described determination of the optimal vibration reduction mode, to prompt the user to change the vibration reduction mode to the optimal mode. In this way, the user can notice whether or not the vibration reduction mode selected by him or her is appropriate, and even inexperienced user can appropriately select the mode. Therefore, it is possible to bring out the performance of the image stabilization apparatus fully.

In the apparatus according to the above-described embodiment, the optimal vibration reduction mode is determined based on whether the angular velocity signal or the angular displacement amount signal deviates from a reference range more than once within the sampling time Ts. However, the frequency criterion is not limited to "more than once", but it may also be "more than twice" or other desirable frequency.

In steps 804, 808, 811 and 816 in FIG. 8, the gains are varied in accordance with the vibration reduction mode in order to realize modes VR1 and Vr2. But the apparatus may be modified in such a way that the modes VR1 and VR2 are realized not only by varying the gains but by performing calculation or other processing that is predetermined for each mode.

Next, as a second embodiment, an apparatus in which a modification is made to the displayed mark that appears, in accordance with the informing process of steps 807 and 810, in the display 201 within the field of view 200 in the apparatus according to the first embodiment is modified.

Figure 11:
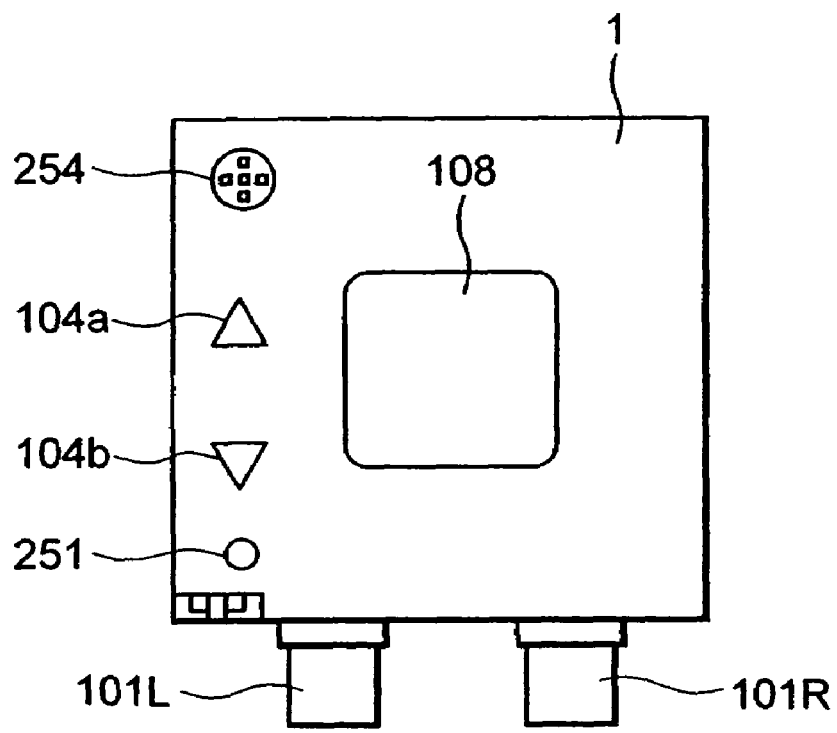
FIG. 11 is a top view of a binocular according to the second embodiment of the present invention.
Figure 12:
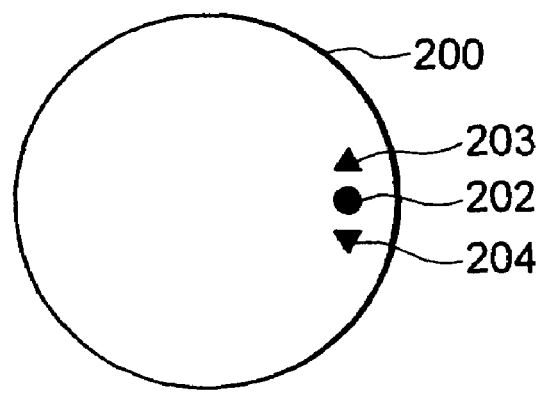
FIG. 12 is a drawing illustrating displays 202, 203 and 204 within the field of view 200 of the binocular according to the second embodiment of the present invention.

In the second embodiment, as shown in FIG. 12, a display within the field of view 200 includes a display 203 indicating an upward red triangle mark, a display 204 indicating a downward red triangle mark and a display 202 disposed between these displays indicating a green circular mark. These displays can be realized by LEDs or other devices. On the upper surface of a housing 1 of the binocular, as shown in FIG. 11, there is provided vibration reduction mode changing buttons 104*a* and 104*b* having the shapes corresponding to the shapes of the marks of the displays 203 and 204. The button 104*a* is to be operated upon changing the vibration reduction mode to mode VR2 when the currently set mode is mode VR1, while the button 104*b* is to be operated upon changing the vibration reduction mode to mode VR1 when the currently set mode is mode VR2.

When in step 807 (in the process shown in the flow chart of FIG. 8) the currently set mode VR1 is not the optimal mode, the CPU 601 causes the upward triangle mark of the display within the field of view 203 to be turned on in red. If the user presses the changing button 104*a* of the same shape in response to the turned-on mark, the CPU 601 causes the circular mark of the display within the field of view 202 to be turned on in green, and the process proceeds to step 811, in which the process for the vibration reduction mode VR2 (that is the mode set after the mode change) is performed. On the other hand, if the user does not press the changing button 104*a* of the same shape in step 807, the process proceeds to step 808, in which the process for the vibration reduction mode VR1 is continued without a mode change. Similarly, when in step 810 the currently set mode VR2 is not the optimal mode, the CPU 601 causes the downward triangle mark of the display within the field of view 204 to be turned on in red. If the user presses the changing button 104*b* of the same shape in response to the turned-on mark, the CPU 601 causes the circular mark of the display within the field of view 202 to be turned on in green, and the process proceeds to step 808, in which the process for the vibration reduction mode VR1 (that is the mode set after the mode change) is performed. On the other hand, if the user does not press the changing button 104*b* of the same shape in step 810, the process proceeds to step 811, in which the process for the vibration reduction mode VR2 is continued without a mode change.

The binocular provided with the image stabilization apparatus according to the second embodiment having the above-described structure realizes an advantageous effect that the user can change the vibration reduction mode to select the optimal mode by operating the button 104a or 104b by a finger in accordance with a figure indicated in the display within the field of view during observation without detaching the eyes from the eyepiece lenses 13R and 13L.

In the process of providing information on the optimal mode determined in step 802, the information may be provided by visual displays or sounds specific to the respective modes that are different from each other. It is preferable that the mode selected by user be indicated in the field of view to inform the user of the mode. When both the mode selected by the user and the optimal mode determined in step 802 are displayed, the user can conveniently recognize the difference between those modes at sight.

The displays within the field of view 203 and 204 may be composed of LEDs or other elements that can emit a color light selected from more than two color lights. In that case, the comparison of the angular velocity signal and the angular displacement amount signal with the reference ranges may be arranged in such a way that the degrees of deviations of those signals from the respective reference ranges are classified into two or more levels. Thus, in the process of informing the user in steps 807 and 810, those levels (or degrees) of the deviation are represented by corresponding colors of light. For example, when the degree of the deviation is relatively low, the displays within the field of view 203 and 204 are caused to emit yellow light, while when the degree of the deviation is relatively high, the displays 203 and 204 are caused to emit red light. Thus, the user can make a decision on the vibration reduction mode in a customized way in accordance with his or her intention, for example, in such a way as to change the vibration reduction mode only when the degree of the deviation is high. Therefore, it is possible to enlarge the variety of use for user of the binocular.

The apparatus according to the above-described embodiment has two vibration reduction modes (VR1, VR2), but the present invention is also applicable to more than two vibration reduction modes (VR1, VR2, VR3, ..., VRn).

The apparatus according to the above-described embodiment is provided with a gimbaled member on which prisms are mounted, angular velocity feedback control means and position feedback control means for controlling the position of the gimbaled member. However, the present invention is also applicable to other types of optical elements.

For example, the present invention can be applied to an apparatus that uses a variable-angle prism for vibration reduction, which is composed of two glass plates and liquid having a high refractive index included between the glass plates in a sealed manner. (The variable-angle prism itself has been already known, and described for example in Japanese Patent Application Laid-Open Nos. 10-319325 and 2000-10143.) In that case, the present invention can be applied to an apparatus that has a variable-angle prism position detector that detects an inclination angle of one of the glass plates and a driving device such as a motor for driving that glass plate in a direction for correcting an inclination of the optical system based on the detection result.

The present invention can be applied to various apparatus in which an inclination of the optical axis of an observation optical system having an erecting prism or other element is detected and the inclination is corrected based on a detection result.

The apparatus according to the present invention may be provided with a mode selecting switch with which a user can select automatic mode switching and manual mode switching that allows the user to select desired mode. In this case, the user can select a desired mode at his or her will depending on circumstances and the user's operation skill.

As per the above, the present invention can provide an image stabilization apparatus having a good usability.

What is claimed is:

1. An image stabilization apparatus comprising:
a housing accommodating an optical system in the interior thereof;
holding means for holding a part of optical members that compose said optical system in such a way as to allow angular displacement of said part of the optical members relative to said housing, in order to maintain the position of said part of the optical members in a predetermined state;
driving means for angularly displacing said part of the optical members in the direction for restoring the position of said part of the optical members that has been angularly displaced;
control means for controlling said driving means, said control means including detection means for detecting information on angular displacement of said part of the optical members and determination means for determining, based on the information detected by said detection means, a control mode for controlling said driving means and suitable for vibration applied to said housing;
a vibration reduction on/off button; and
a mode setting dial by which a vibration reduction mode differing in control mode is selectable and by which can be set, a SHIFT Position mode in which, upon depression of the vibration reduction on/off button, a vibration reduction mode set prior to the depression of vibration reduction on/off button is switched over to a vibration reduction mode differing therefrom.

2. An image stabilization apparatus according to claim 1, wherein:
said image stabilization apparatus has an automatic vibration reduction mode in which switching is made automatically to an optimal vibration reduction mode in accordance with an optimal vibration reduction mode judged based on the information of the detected vibration; and
in the state where the SHIFT Position mode is set, switching to the automatic vibration reduction mode is not enabled.

3. An image stabilization apparatus according to claim 1, further having:
a field of view which effects a display indicating that at least the set vibration reduction mode is not optimal; and
an automatic vibration reduction mode in which switching is made automatically to an optimal vibration reduction mode in accordance with an optimal vibration reduction mode judged based on the information of the detected vibration,
wherein, in the state where the SHIFT position is set, the field of view is made not enabled.

4. A binocular comprising:
a pair of eyepiece optical systems:
a pair of objective optical systems;

an intermediate optical system provided on an optical axis between said eyepiece optical systems and objective optical systems;

a housing accommodating said eyepiece optical systems, said objective optical systems and said intermediate optical system;

holding means for holding a part of optical members that compose said intermediate optical system in such a way as to allow angular displacement of said part of the optical members relative to said housing, in order to maintain the position of said part of the optical members in a predetermined state;

driving means for angularly displacing said part of the optical members in the direction for restoring the position of said part of the optical members that has been angularly displaced;

control means for controlling said driving means, said control means including detection means for detecting information on angular displacement of said part of the optical members and determination means for determining, based on the information detected by said detection means, a control mode for controlling said driving means and suitable for vibration applied to said housing;

a mode setting dial by which a vibration reduction mode is differing in control mode is selectable and is provided with a SHIFT Position mode;

a vibration reduction on/off button; and in the SHIFT position mode, in a state where the SHIFT position mode is set by the mode setting dial, upon depressing the vibration reduction on/off button, switching is made to a vibration reduction mode differing from a vibration reduction mode prior to depressing the vibration reduction on/off button.

5. An image stabilization apparatus according to claim 4, wherein said informing section can display a mode selected by user and a mode judged by the apparatus at the same time.

6. An image stabilization apparatus according to claim 4, further comprising a mode setting dial by which a vibration reduction mode differing in control mode is selectable, the mode setting dial being able to set a control mode corresponding to a control mode displayed in the informing section, and thereafter can change setting to a control mode differing from the displayed control mode.

* * * * *